United States Patent
Whiteside

(12) 
(10) Patent No.: US 12,253,196 B1
(45) Date of Patent: Mar. 18, 2025

(54) TRANSITION COUPLING ASSEMBLY AND METHOD

(71) Applicant: MI-FAB Manufacturing, LLC, Chicago, IL (US)

(72) Inventor: Michael J. Whiteside, Chicago, IL (US)

( * ) Notice: Subject to any disclaimer, the term of this patent is extended or adjusted under 35 U.S.C. 154(b) by 5 days.

(21) Appl. No.: 17/960,633

(22) Filed: Oct. 5, 2022

Related U.S. Application Data

(60) Provisional application No. 63/252,441, filed on Oct. 5, 2021.

(51) Int. Cl.
*F16L 25/14* (2006.01)
*F16L 55/115* (2006.01)

(52) U.S. Cl.
CPC ............. *F16L 25/14* (2013.01); *F16L 55/115* (2013.01)

(58) Field of Classification Search
CPC ................................. F16L 55/115; F16L 25/14
See application file for complete search history.

(56) References Cited

U.S. PATENT DOCUMENTS

| 550,097 | A | * | 11/1895 | Clift | F16L 25/026 |
|---|---|---|---|---|---|
| | | | | | 285/50 |
| 4,116,477 | A | * | 9/1978 | Wahoski | F16L 19/00 |
| | | | | | 285/148.23 |
| 2002/0017790 | A1 | * | 2/2002 | Holmes, IV | F16L 25/14 |
| | | | | | 285/337 |
| 2015/0069749 | A1 | * | 3/2015 | Smith | F16L 55/115 |
| | | | | | 285/3 |

FOREIGN PATENT DOCUMENTS

| DE | 3423600 | A1 | * | 1/1986 | |
| FR | 623057 | A | * | 6/1927 | |
| GB | 2274856 | A | * | 8/1994 | ............ E03F 5/0401 |

* cited by examiner

*Primary Examiner* — Zachary T Dragicevich
*Assistant Examiner* — James A Linford

(57) ABSTRACT

A transition coupling assembly for use in the construction of a concrete floor containing vertical pipe stubs. A transition coupling body is used to cap a vertical pipe during the pouring of the slab. After the concrete floor is finished, a thin layer of concrete may be removed from above the cover and then the cover is removed to reveal an opening leading to the second end of the coupling. A second pipe may be connected to a second socket in the transition coupling to form a vertical pipe stub to provide a waste pipe for a toilet, sink, or other plumbing fixture.

7 Claims, 8 Drawing Sheets

TRANSITION COUPLING ASSEMBLY AND METHOD

TECHNICAL FIELD

The present invention relates generally to the field of building and construction and specifically to the installation of concrete floors with vertical pipes extending upward therefrom.

BACKGROUND ART

In a typical installation, a plumbing contractor may have PVC pipes sticking up vertically from the ground in a warehouse slab construction. The concrete contractor that is installing the concrete floor around the pipes does not want to have pipes sticking up out of the floor during installation. Typically the concrete contractor must "box out" around the vertical PVC pipe with foam or other spacer material. What is needed is a better and more efficient device and system for installing concrete floors around vertical pipes.

DETAILED DESCRIPTION

Figure 1:
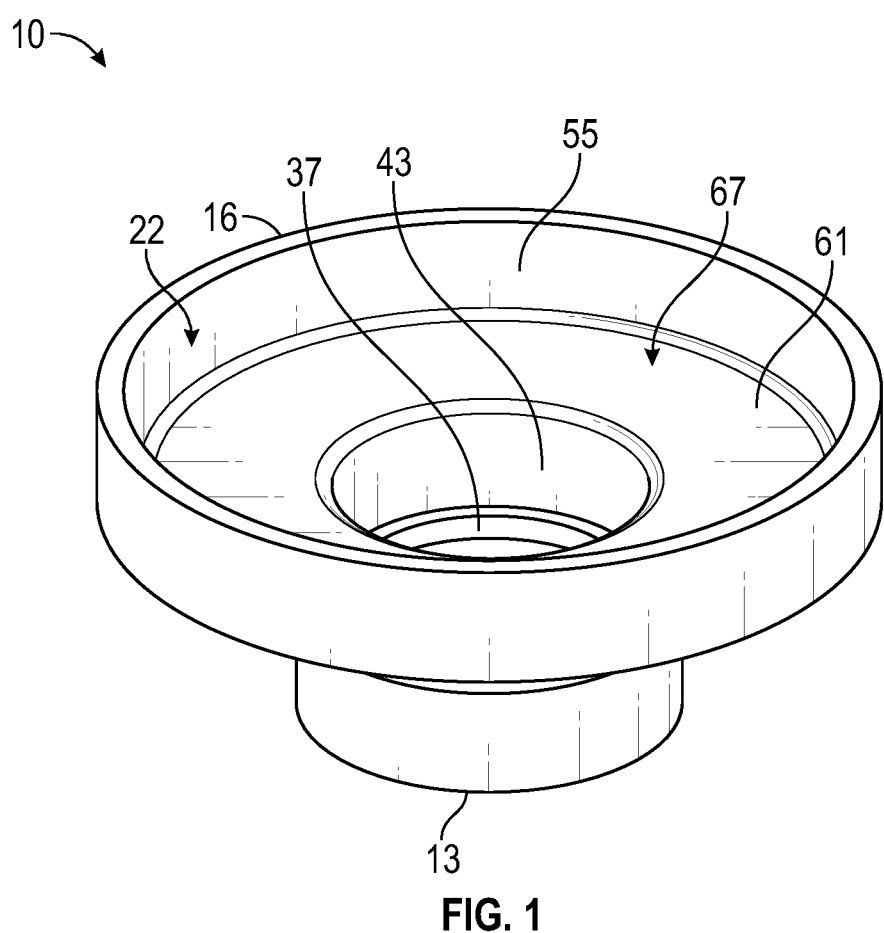
FIG. 1 is a perspective view of a coupling body of the present invention.
Figure 2:
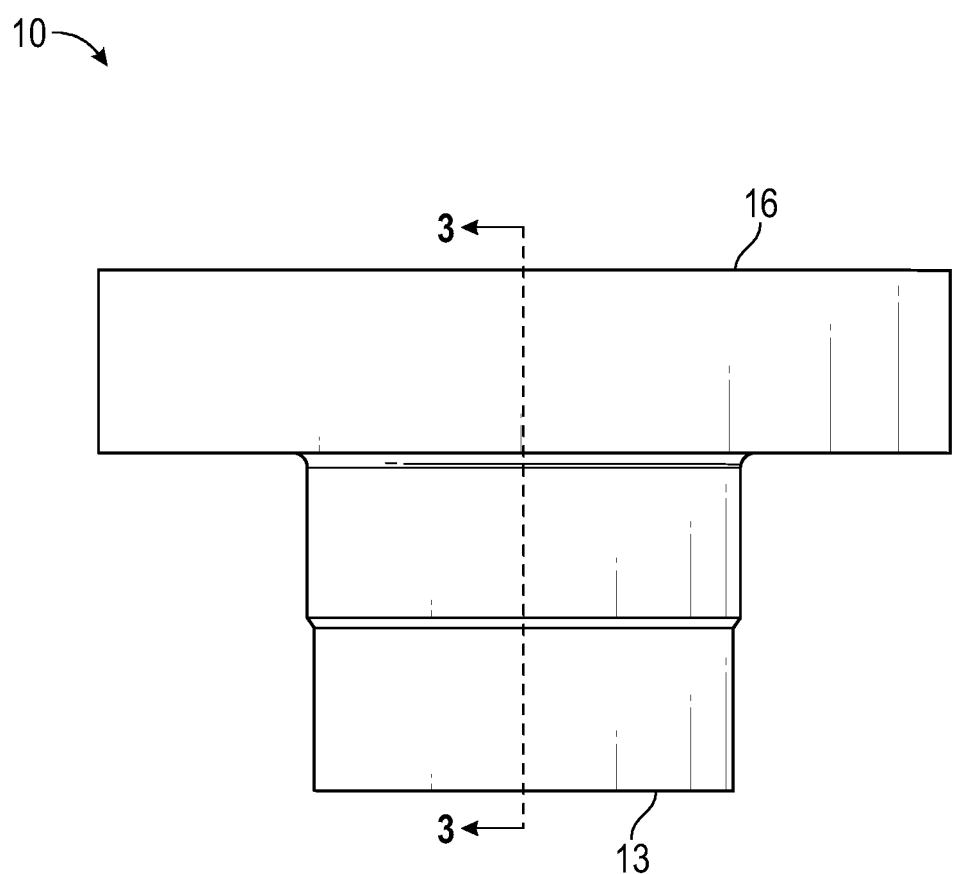
FIG. 2 is a side elevational view of the coupling body shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 3:
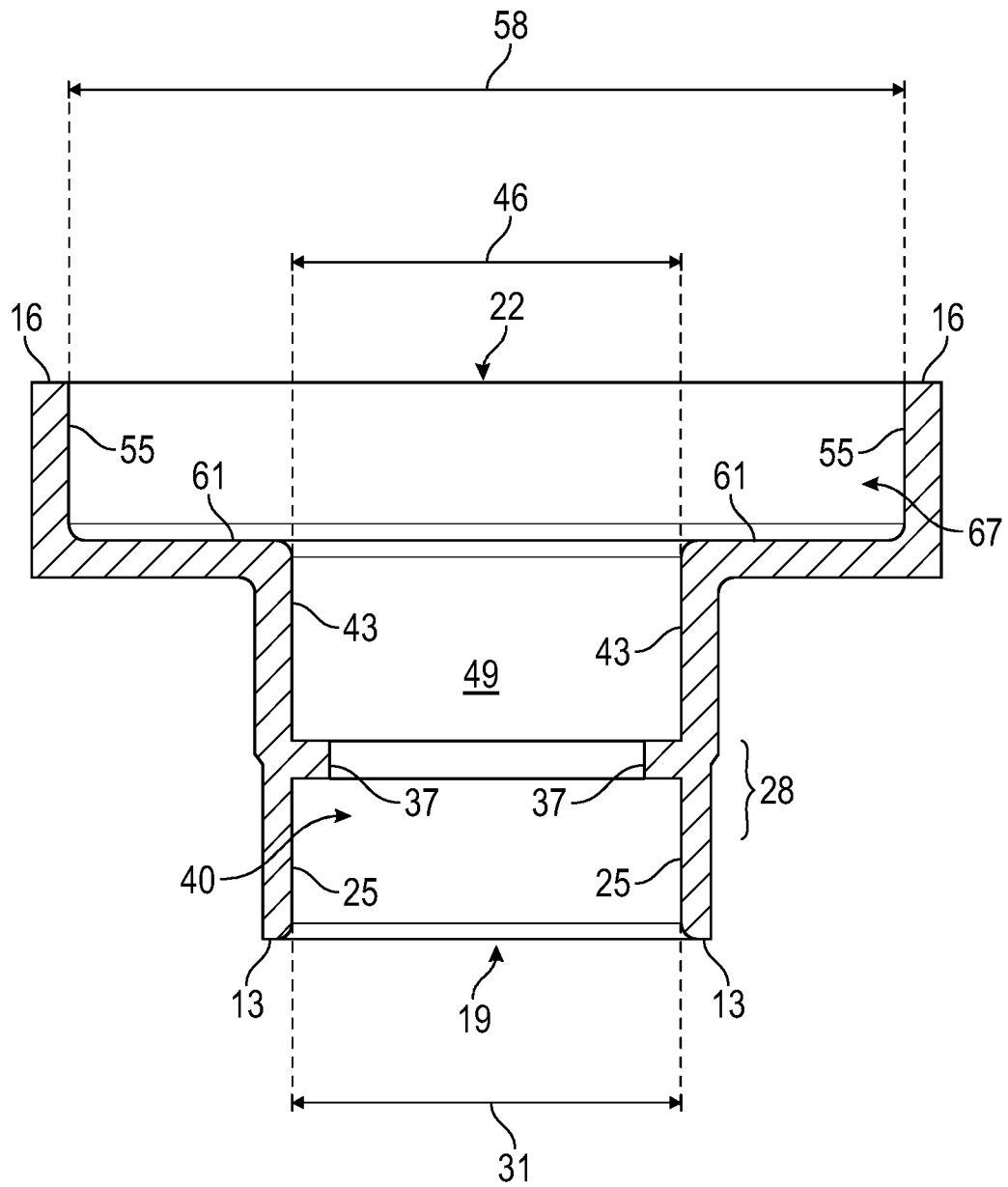
FIG. 3 is a cross-sectional view taken along lines 3-3 of FIG. 2.

Referring to FIGS. 1-8, and FIG. 1 initially, in one embodiment the assembly of the present invention includes a body 10 having a first end 13 and a second end 16. Turning to FIG. 3, a first opening 19 is defined at the first end 13 of the body 10. A second opening 22 is defined at the second end 16 of the body 10. The body 10 has a first inner wall section 25 that extends from the first end 13 to a mid-portion 28 of the body 10. The first inner wall section 25 has an inside diameter 31 sized to receive a vertical pipe 34.

Figure 4:
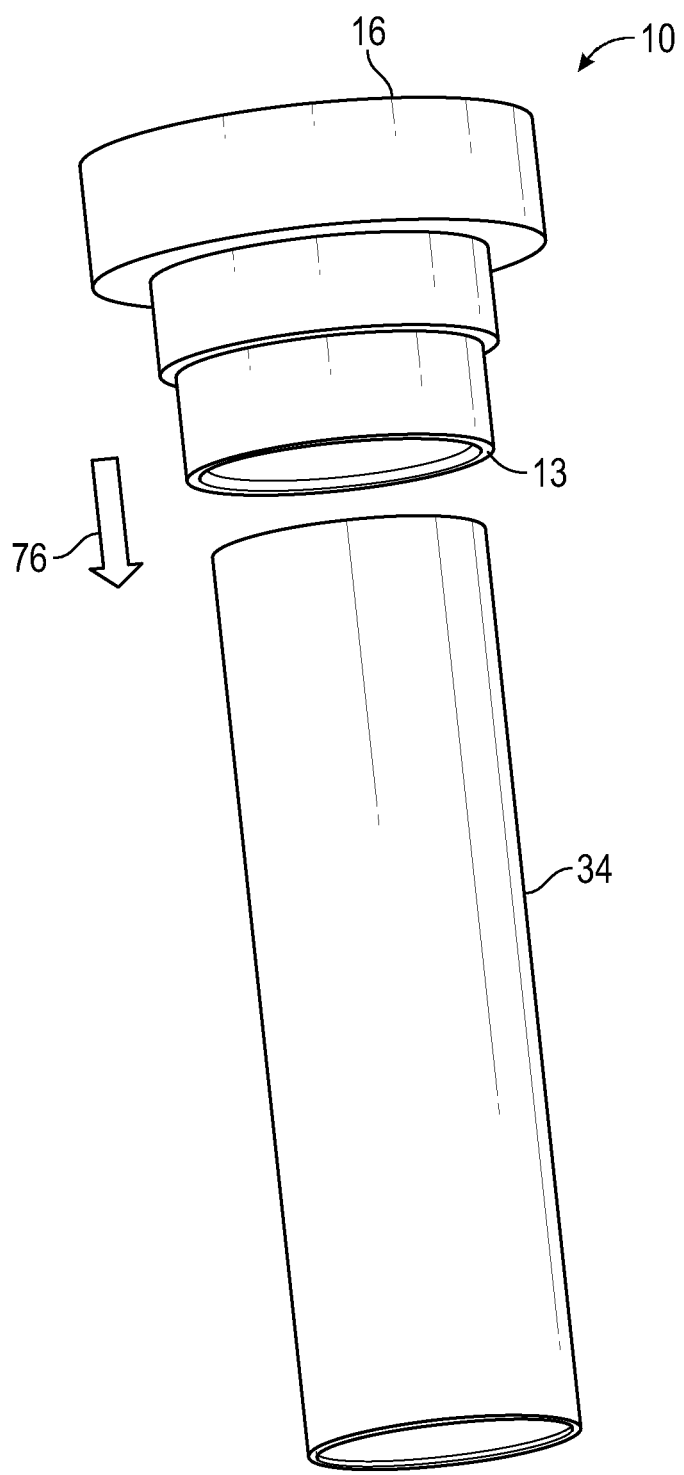
FIG. 4 is an exploded perspective view of a portion of the assembly of the present invention in the first stage of deployment.
Figure 5:
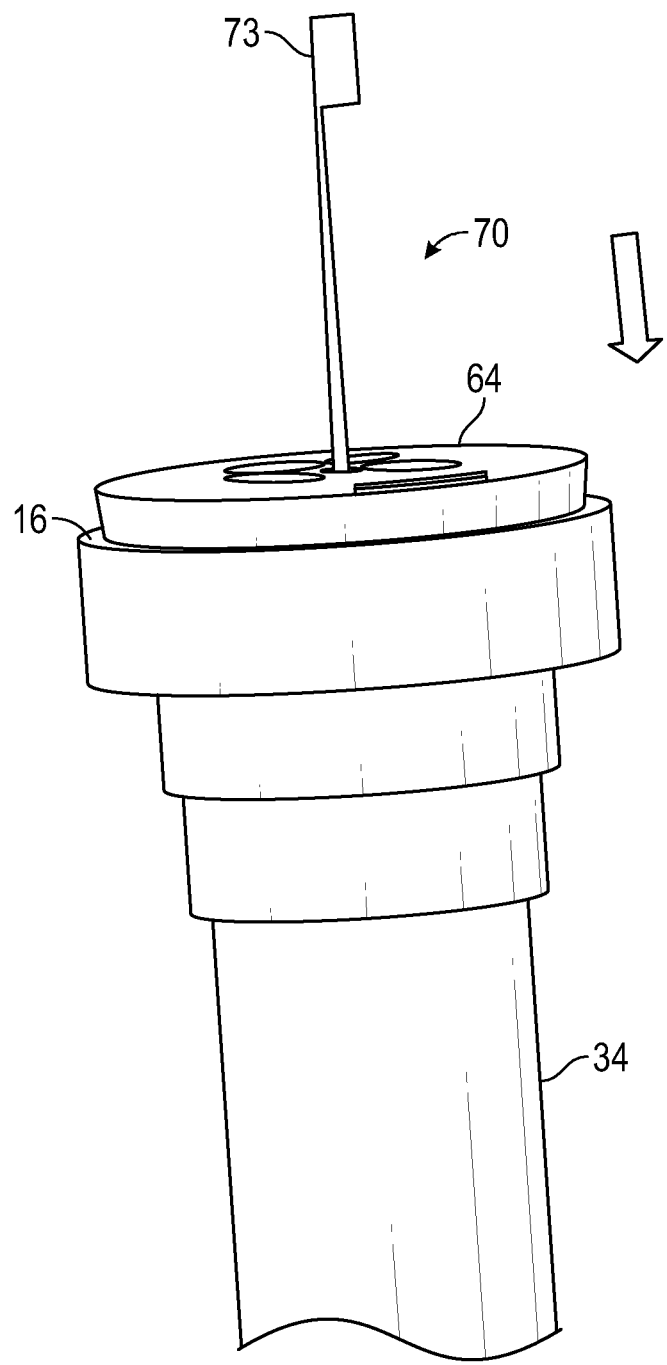
FIG. 5 is a perspective view of a portion of the assembly in a second stage of deployment.
Figure 6:
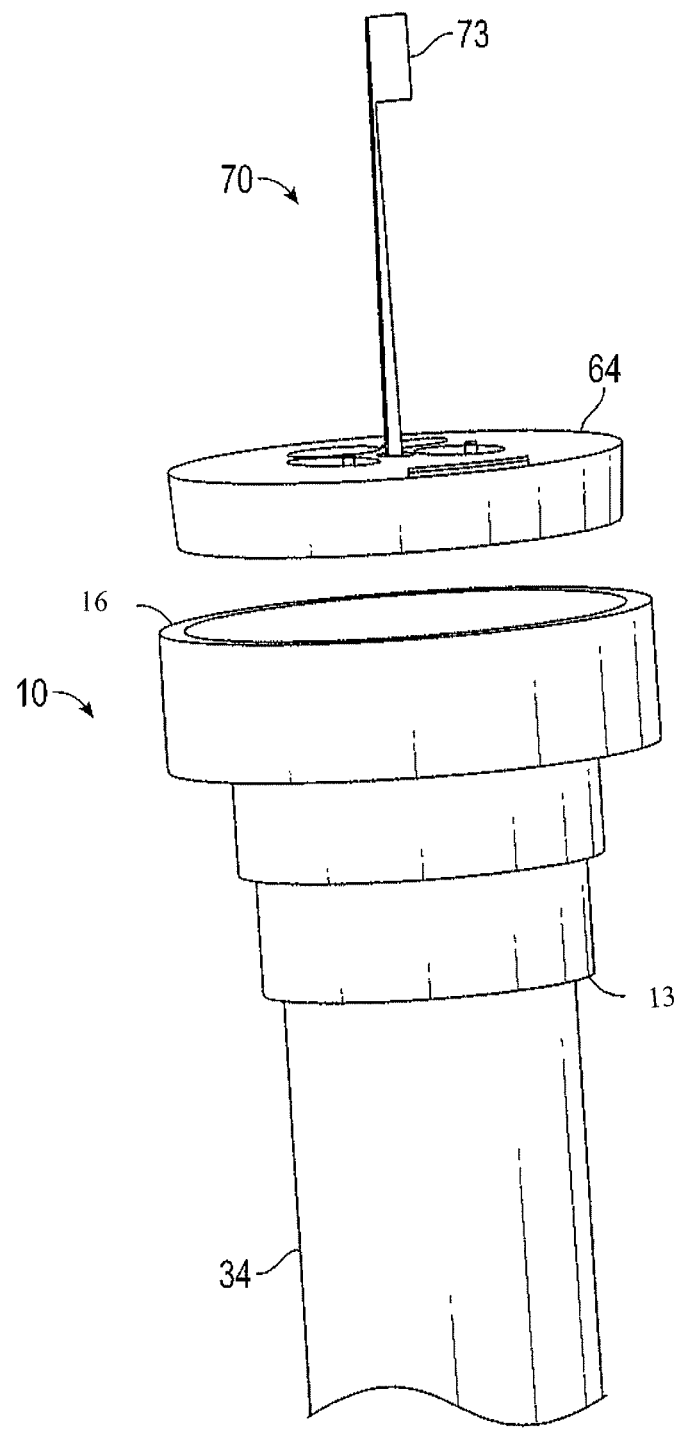
FIG. 6 is a perspective view of a portion of the assembly in a third stage of the deployment.
Figure 7:
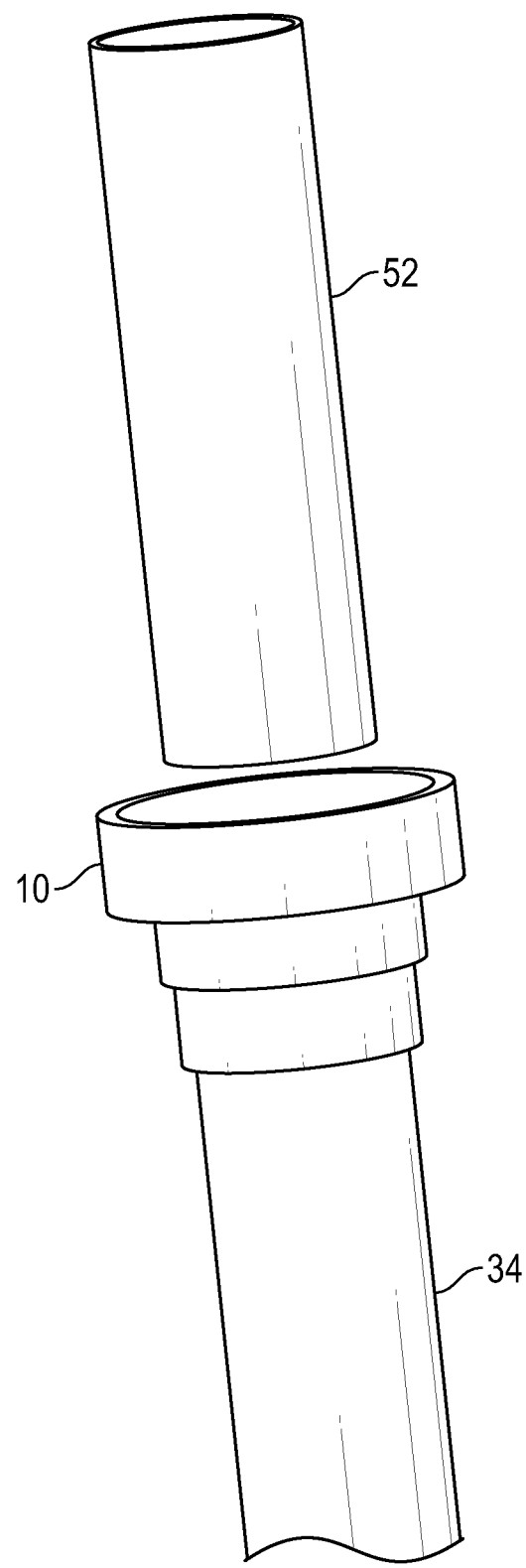
FIG. 7 is a perspective view of a further stage of deployment of the assembly of the invention.
Figure 8:
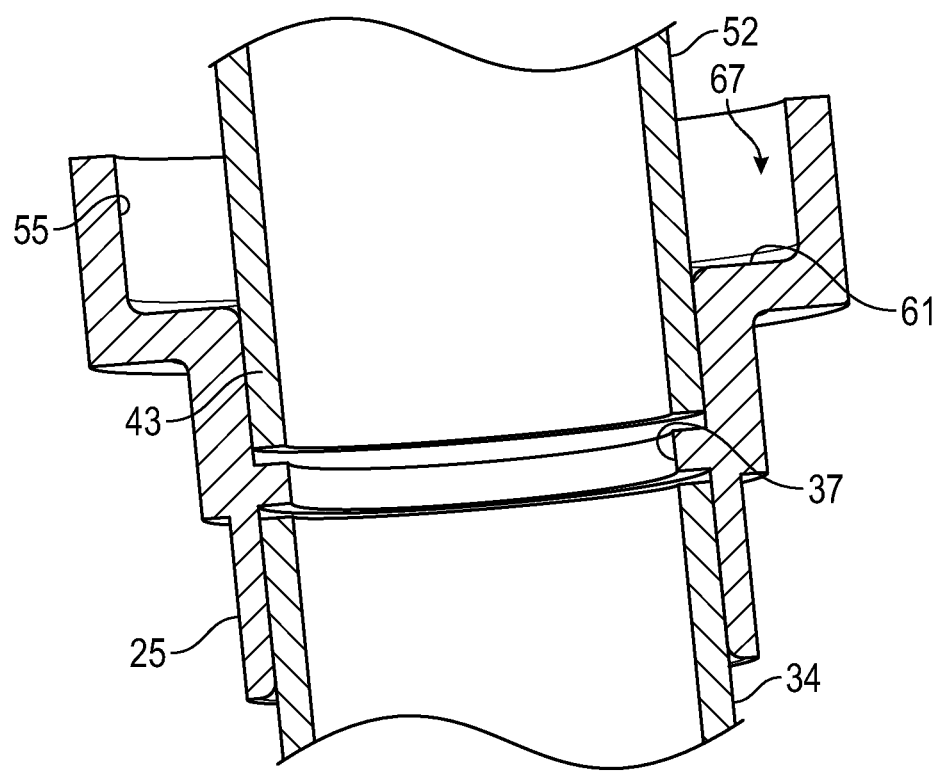
FIG. 8 is a perspective view of a further stage of deployment of the assembly of the invention.

A protuberance 37 extends inward from the first inner wall section 25. The protuberance 37 is configured to provide an obstruction limiting how far the vertical pipe 34 can extend inside the first inner wall section 25. The protuberance 37 combines with the inside diameter 31 of the first inner wall section 25 to provide a first socket 40 for receiving the vertical pipe 34 (FIG. 4).

A second inner wall section 43 in the body 10 may be provided with an inside diameter 46 substantially equal to the inside diameter 31 of the first inner wall section 25. The second inner wall section 43 is disposed on a side of the protuberance 37 that is opposite from the first inner wall section 25. The inside diameter 46 of the second inner wall section 43 and the protuberance 37 combine to provide a second socket 49 configured to receive a second pipe 52 (FIG. 7) to be joined with the vertical pipe 34 after the concrete floor is installed as will be described in detail herein.

The protuberance 37 may extends from the first inner wall section 25 a distance substantially equal to the wall thickness of the vertical pipe 34 and the second pipe 52 such that a continuous surface is formed when the second pipe 52 is joined to the vertical pipe 34 via the transition coupling body 10.

A third inner wall section 55 has an inside diameter 58 that is larger than the inside diameter 31 of the first inner wall section 25 or the inside diameter 46 of the second inner wall section 43. The third inner wall section 55 may extend to the second end 16 of the body 10.

A lateral wall section 61 may extend between the top of the second inner wall section 43 and the bottom of the third inner wall section 55.

A cover 64 may be sized to fit in the cavity 67 formed between the third inner wall section 55 and the lateral wall section 61.

A locating device 70 may be attached to the cover 64. For example, a whisker 73 may extend from the cover 64.

Turning to FIG. 4, the transition coupling assembly of the present invention may be deployed in the following manner during construction of a floor.

The vertical pipe 34 is measured and cut such that when the body 10 is inserted on the vertical pipe 34 in the direction of arrow 76 in FIG. 4, the second end 16 of the body 10 is just below the level of the finished concrete floor. Next, the concrete is poured onto the cover 64 around the locating device 70. After the concrete contractor pours the cement floor, the plumbing contractor taps on the concrete above the cover 64 and then uses channel locks to remove the cover 64. After the cover 64 is removed, an opening is provided for inserting the second pipe 52 into the second socket 49 to hold the PVC pipe 52 in a vertical position above the floor in order to provide a waste pipe for a toilet, sink, or other plumbing fixture.

The present invention contemplates that many changes and modifications may be made. Therefore, while the presently-preferred form of the transition coupling assembly has been shown and described, and several modifications and alternatives discussed, persons skilled in this art will readily appreciate that various additional changes and modifications may be made without departing from the spirit of the invention, as defined and differentiated by the following claims.

The invention claimed is:

1. A transition coupling assembly for use with a vertical pipe during construction of a floor, the transition coupling assembly, comprising:
a body having a first end and a second end, a first opening defined at the first end and a second opening defined at the second end, the body having a first inner wall section extending from the first end to a mid-portion, the first inner wall section having an inside diameter sized to receive the vertical pipe;
a protuberance extending inward from the first inner wall section, the protuberance configured to provide an obstruction limiting how far the vertical pipe can extend inside the inner wall of the body, the protuberance combining with the inside diameter of the first inner wall section to provide a first socket for receiving the vertical pipe;
a second inner wall section having an inside diameter substantially equal to the inside diameter of the first inner wall section, the second inner wall section disposed on a side of the protuberance opposite from the first inner wall section, the inside diameter of the second inner wall section and the protuberance configured to provide a second socket to receive a second pipe to be joined with the vertical pipe;
a third inner wall section having an inside diameter larger than the first or second inner wall sections, the third inside diameter extending to the second end of the body;
a lateral wall section extending between the top of the second inner wall section and the third inner wall section, the lateral wall section forming a shoulder adjacent to the third inner wall section;
a cover sized to fit inside the third inner wall adjacent to the shoulder, the cover having a top surface disposed above the second end of the body when the cover is installed on the body; and,
a locating device extending from the top surface of the cover.

2. The transition coupling assembly of claim 1, wherein the first inner wall section is aligned with the second inner wall section when the body is installed on the vertical pipe and the second pipe.

3. The transition coupling assembly of claim 1, wherein the vertical pipe is cylindrical.

4. The transition coupling assembly of claim 1, wherein the second pipe is cylindrical.

5. The transition coupling assembly of claim 1, wherein the locating device comprises a whisker.

6. The transition coupling assembly of claim 1, wherein the lateral wall section extends perpendicular to the second inner wall section.

7. The transition coupling assembly of claim 1, wherein the protuberance extends from the first inner wall section a distance substantially equal to the wall thickness of the vertical pipe and the second pipe such that a continuous surface is formed when the second pipe is joined to the vertical pipe via the transition coupling.

* * * * *